Figure 1:
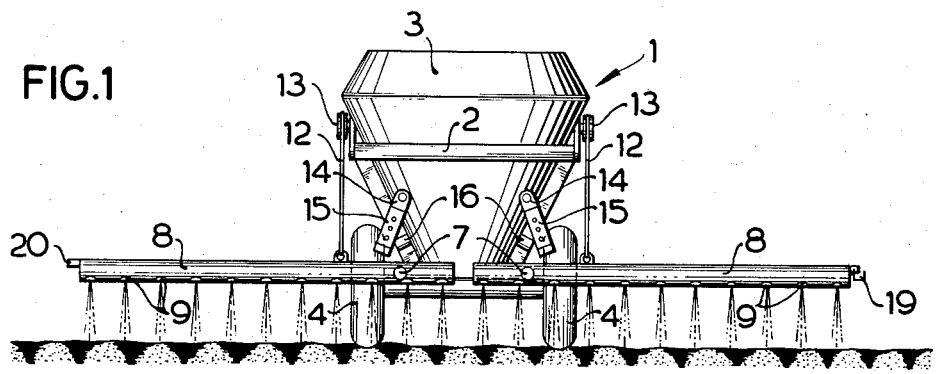

United States Patent [19]
Dreyer

[11] 3,809,316
[45] May 7, 1974

[54] MACHINE FOR THE DISTRIBUTION OF GRANULATED AND POWDERED MATERIALS

[75] Inventor: Heinz Dreyer, Hasbergen-Gaste, Germany

[73] Assignee: Amazonen-Werke, H. Dreyer, Postfach, Gaste, Germany

[22] Filed: Nov. 29, 1972

[21] Appl. No.: 310,492

[30] Foreign Application Priority Data
Dec. 8, 1971 Germany............................ 2160751

[52] U.S. Cl.................................. 239/167, 239/668
[51] Int. Cl............................................... B05b 1/20
[58] Field of Search..................... 239/166, 167, 668

[56] References Cited
UNITED STATES PATENTS
3,023,970  3/1962  Knoell................ 239/167
3,581,993  6/1971  Reams................. 39/167
3,587,624  6/1971  Holloway............. 239/167
2,781,229  2/1957  Thornburg........... 239/166

Primary Examiner—Lloyd L. King
Attorney, Agent, or Firm—Burgess, Dinklage & Sprung

[57] ABSTRACT

A farm machine such as a planter having pivotably mounted side booms for distribution of, for example, seeds. A lifting system is provided for pivoting the booms. Stop means are provided for limiting upward pivoting of the side booms to a small angle above the horizontal for accommodating the making of turns by the machine. The stop means are disengageable, and when the stop means are disengaged, the booms can be pivoted upwardly beyond said small angle to a transport position.

11 Claims, 8 Drawing Figures

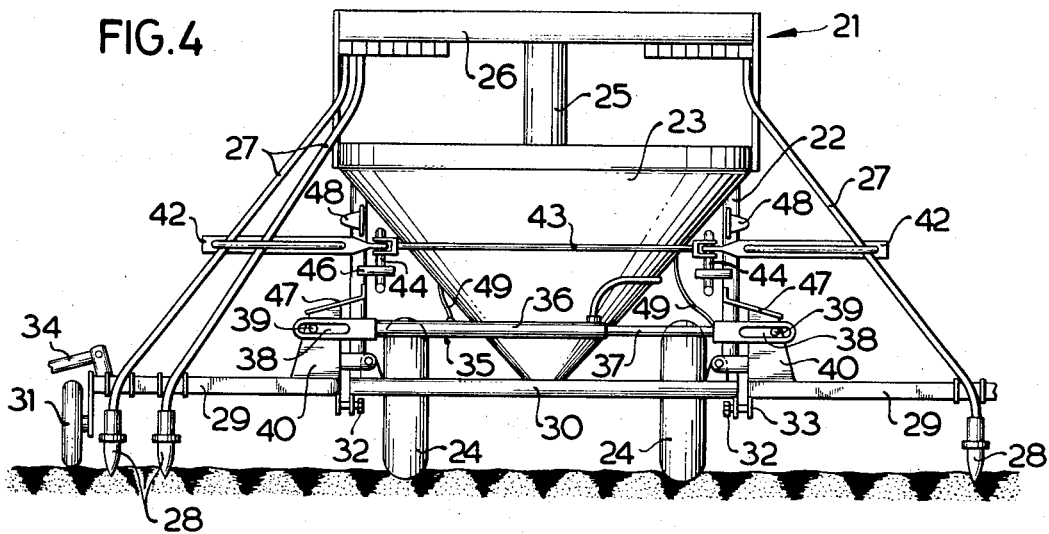
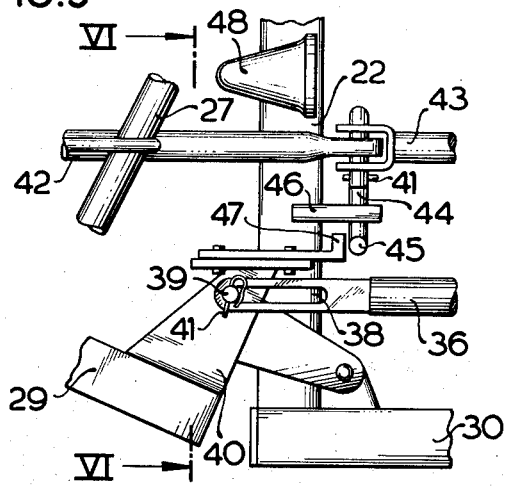
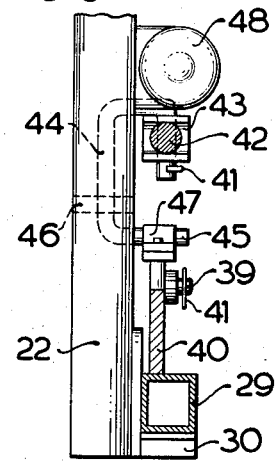
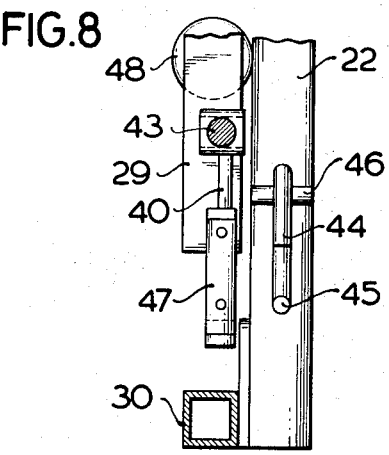
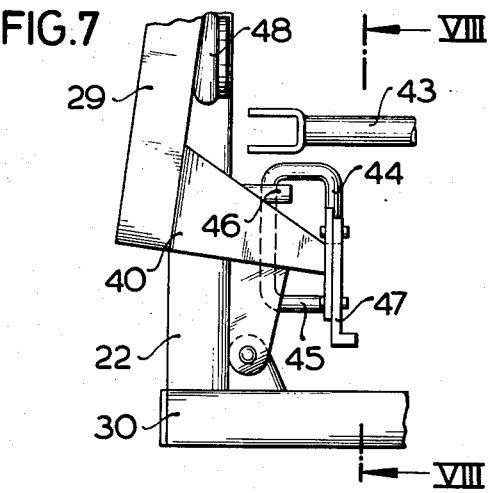

MACHINE FOR THE DISTRIBUTION OF GRANULATED AND POWDERED MATERIALS

BACKGROUND

The invention relates to a machine for the discharge of granulated and powdered materials, the said machine being designed to be coupled to a tractor and having a central hopper and lateral booms extending beyond the hopper transversely of the direction of travel, the said booms being provided with discharge members and being designed to pivot in the vertical plane with the aid of a lifting system. The object of the invention is to improve the pivoting and hence the guidance of the lateral booms in the vertical plane.

According to German Offenlegungsschrift 1,934,247, a machine of the above-described type is known. This machine has the disadvantage, especially with regard to turning about at the end of the field, that, after a slight lifting of this machine, which is designed as a planter, the lateral booms, in spite of the fact that their downward pivoting is limited, strike against the ground as a result of the rocking of the tractor and of the machine, so that the booms or the discharge members mounted thereon may become bent. Even when the machine is raised all the way up to the transport position, this danger still exists unless the booms are also pivoted upwardly out of the way. This pivoting of the booms to the transport position, however, requires a great amount of time. Furthermore, in this case the trace scribers that may be mounted on the side booms may become bent or broken off, because when the booms are raised they hang downward and when the booms are lowered without additional guidance the trace scribers may hit the ground first and then have to be forced sideways in the earth into their working position. The stresses thus produced may again result in distortion or breakage in the trace scribers and in the mountings thereof.

THE INVENTION

The object of the invention is achieved and these disadvantages are eliminated by the fact that disengageable stop means are provided within the pivoting range of the booms. As a result of this measure, the side booms are pivoted only as far as these stops by actuating the lifting system for the purpose of turning about at the end of the field. For this short lift only a very small amount of time is required, which in the case of farm machines can be shortened still further by performing the raising of the booms simultaneously with the raising of the machine, the machine having to be raised only to the height required for the turning of the machine alone, independently of the side booms. On the other hand, it is sufficient to raise the side booms as far as the stops in order to prevent their outside ends or the discharge members mounted thereon from hitting the ground even in the case of severe lateral rocking of the machine.

The invention furthermore provides that the stops are made adjustable. This measure makes it possible to adapt the height to which the side booms can be raised for turning to the various types of soil and terrain. For example, on flat and finely tilled seed bed the stops will be adjusted lower than they will on stub-plowed fields and uneven terrain, because in the former case the rocking of the machine will be substantially less than in the latter.

In a preferred embodiment, the lifting system consists in a known manner of a hydraulic cylinder attached to one boom, with the piston rod connected to the other. This assures an especially easy and convenient raising and lowering of the side booms. Furthermore, this simple type of arrangement eliminates the need for special parts to mount the hydraulic cylinder on the machine. Lastly, these measures compensate for unavoidable manufacturing tolerances, since the hydraulic cylinder can move freely and thus in all cases both side booms will be raised all the way to the stops.

In order to achieve a differential pivoting of the side booms when in the lowered, working position, and thus an adaptation of the discharge members to the various types of soil and terrain, the invention provides elongated holes at the points where the side booms are attached to the cylinder and piston rod. It has furthermore proven to be advantageous for the cylinder and the piston rod to be joined to the side booms by means of removable pins and secured against axial displacement thereon by means of spring cotter pins, means then being provided for holding the hydraulic cylinder on the machine so as to make it possible to operate the booms by hand should the hydraulic system fail. Additionally, in this manner the arrangement can be such that the raising of the booms to the transport position, which needs to be performed only once each time that the machine is used, can be performed basically by hand, the hydraulic cylinder then being used only to lift the side booms as far as the stops, so that the hydraulic cylinder can be made substantially smaller.

In the case of a machine in which the center of gravity of the side booms in the transport position is inside of the center of gravity of the booms when in the vertical position and the side booms lean in the transport position against stops; the invention provides that the stops are equipped with resilient members whose resilient excursion is greater than the distance which the booms must travel in their upward movement toward the transport position between their top dead center and the said transport position and whose elastic force is greater than the force exerted by the booms on the resilient members in the transport position. As a result of these measures, the lifting apparatus needs to exert on the side booms only a force acting in the direction of their lifting, because when this force is removed, the side booms are pushed back by the resilient members beyond the dead center of their pivoting movement and are carried down to the ground by their own weight, the elements of the lifting system serving as brakes. In a preferred embodiment, the resilient member consists of a rubber bumper or cushion. Lastly, the invention provides a construction where, in the case of a machine in which a proportioning device is provided by which the material is delivered through tubes to the discharge members, the feed tubes associated with the discharge members mounted on the side booms are disposed on removable holders, and wherein the stops are in the form of fastening means for the holders which may be shifted to the disengaged position when the stops and holders are released and the holders removed. This prevents the side booms form being raised to the top transport position with the holders for the outer feed tubes attached, which would damage these holders and the outer feed tubes with them.

Figure 2:
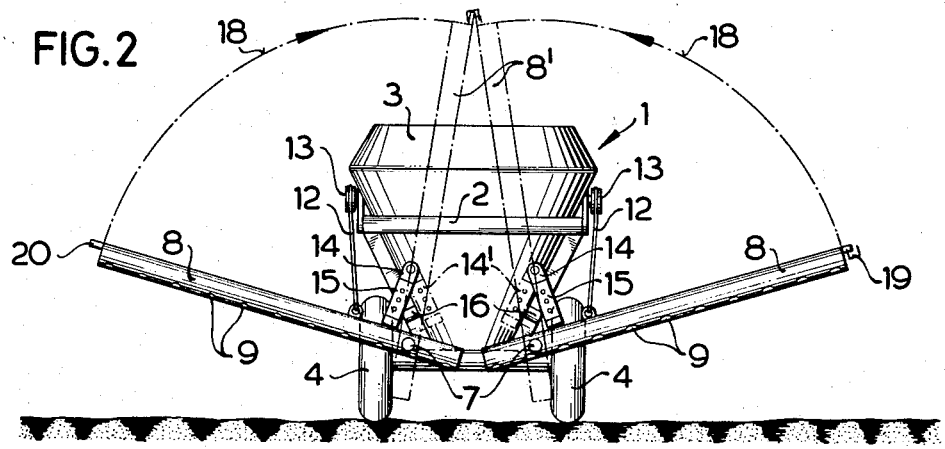
Figure 3:
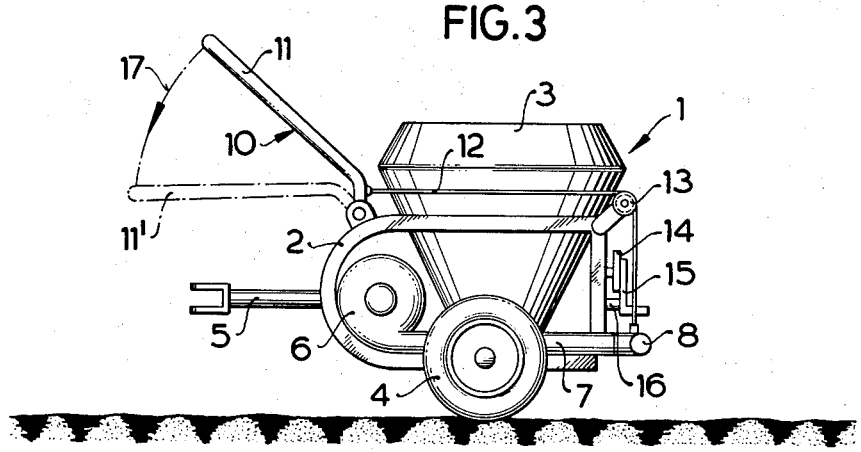

The invention will be further explained with the aid of the embodiments illustrated in the appended drawings. FIG. 1 shows a rear elevational view of a machine of the invention in the form of a fertilizer spreader with side booms in the working position. FIG. 2 is also a rear elevational view of the same machine with the booms raised to the stops. FIG. 3 is a side elevational view of the machine of FIG. 1. FIG. 4 is a machine of the invention in the form of a seed drill in the working position, as seen from the rear. FIG. 5. is a fragmentary rear elevational view on a larger scale of a portion of the lifting system of the machine of FIG. 4 with the left side boom raised as far as the stop. FIG. 6 is a cross-sectional view of the same portion, taken along the line IV—IV in FIG. 5. FIG. 7 is a rear elevational view of the same portion with the left side boom raised to the transport position. FIG. 8 is a cross section of the portion shown in FIG. 7, taken along the line VII—VII in FIG. 7.

The machine 1 represented in FIGS. 1 to 3 has a frame 2 which bears a hopper 3 and which is supported on the ground by the two wheels 4. To the front of the frame is fastened the draw bar 5 which serves to couple the machine to a tractor which is not shown. On the front portion of the frame 2 there is mounted the blower 6 which is powered from the power takeoff shaft of the tractor. The air stream produced by this blower 6 is divided into the two ducts 7 and delivered to the tubular side booms 8 which are mounted rotatably on the ducts 7. The material contained in the hopper is fed through adjustable apertures, which are not shown, into the ducts 7, entrained by the air stream, and blown against the ground through the discharge apertures 9 located in the side booms 8.

To enable the side booms 8 to be pivoted in a vertical plane, there is provided on the machine the lifting system 10 (FIG. 3) which consists of the lever 11 pivoted in a forward location on the frame 2, the cables 12 and the pulleys 13. On the rearward portion of the frame 2 the stops 14 are pivotably mounted, each of them containing an adjustable stop pin 15 and engaging the stud 16 when in the working position. To lift the side booms 8 in order to turn the machine about at the end of the field, the lever 11 is lowered in the direction of the arrow 17 (FIG. 3) to a lower position 11' in which the side booms 8 contact the stop pins 15 (FIG. 2). For transporting the machine, the stops 14 are swung inwardly to the position 14', so that the side booms 8 can be swung by means of the lifting system 10 or directly by hand in the direction of the arrows 18 (FIG. 2) into the upper, transport position 8' in which their outer ends lie against one another or are locked together by means of the hook 19 and the eye 20 (FIG. 1).

The machine 21 in FIGS. 4 to 8 is constructed in a prior-art manner as an "Anbaumaschine," and likewise has a frame 22 on which the hopper 23 as well as the two wheels 24 are mounted. The material in the hopper 23 is fed through the screw conveyor 25 to the proportioning system 26 and from there through tubes 27 and the seed drill tubes 28, of which only the outermost are shown, into the soil. The outer seed drill tubes 28 are arranged in a conventional manner on the two side booms 29 which are articulately mounted on a beam 30. In order to assure a uniform descent of all drill tubes 28 into the soil, the supporting wheels 31 are removably mounted on the outer ends of the side booms 29. When these supporting wheels 31 are removed, or to prevent the supporting wheels 31 from sagging down as the machine passes over depressions in the ground, it is possible by turning the adjusting screws 32 which are mounted on the beam 30 and which may be engaged by the plates 33 disposed at the inner ends of the side booms 29, to regulate the distance between the ground and the outer ends of the side booms 29. To permit precisely parallel courses to be run, the trace scribers 34, of which only one is shown in a fragmentary manner, are articulated at the outer ends of the side booms 29. The lifting means for raising the side booms 29 is the hydraulic jack 35, which is connected in a conventional manner to the hydraulic pump of the tractor, which is not shown, and whose cylinder part 36 and piston rod 37 are joined through elongated holes by the pins 39 to the arms 40 affixed to the side booms 29. The cylinder 36 and the piston rod 37 are prevented from shifting axially on pins 39 by spring cotter pins 41 FIG. 5.

To prevent sagging and hence a—to some extent—insufficient steepness of the outer tubes 27, the latter are carried in the tube holders 42. These holders 42 are removably attached to a middle holder 43 mounted on the hopper 23. The bent stop rods 44 serve for this arrangement, the lower ends 45 (FIG. 5) of these stop rods extending downwardly in the position in which the stop rods 44 join the tube holders 42 to the middle holder 43 these stop rods are mounted rotatably on frame 22 in the lugs 46. Furthermore, the stop members 47 are fastened to the upper end of the arms 40 and are adjustable by known means. If the machine 21 is to be turned about at the end of a field, the hydraulic system is energized. The pressure thereby exerted on the piston of the hydraulic cylinder 35 moves the piston rod 37 into the cylinder 36 so that first the elongated holes 38 slide over the pins 39 to their outer end, and then the side booms 29 are lifted until the stop members 47 come into engagement with the bottom ends 45 of the stop rods 44. After the turn is completed, all that is necessary is to de-energize the hydraulic system, so that the side booms 29 will move downwardly under their own weight until the supporting wheels 31 contact the ground or the plates 33 engage the adjusting screws 32. The same process can be performed when the machine 21 or one of the side booms 29 has to be pulled over a depression in the soil, without the need to interrupt the seeding operation.

If the side booms 29 have to be pivoted all the way upwardly for transport, first the stop rods 44 must be extracted from the middle holder 43 and the tube holders 42. The tube holders 42 are removed and the feed tubes 27 are removed from the drill tubes 28 and laid upon the rear, middle portion of the machine 21. Then the stop rods 44 are rotated about 90° inwardly in the lugs 46 so that the bottom ends 45 of the stop rods 44 point toward one another. In this manner the stop members 47 can move past the stop rods 44 when the side booms 29 are pivoted. When the side booms 29 are lifted they finally engage the rubber bumpers 48, the latter being collapsed by the pressure of the hydraulic system. When the hydraulic system is shut off, the rubber bumpers 48 urge the side booms 29 back beyond the top dead center of their pivoting movement, so that they pivot of their own weight back to their working position, their fall being retarded by the oil flowing back in the hydraulic system. In the event of a failure of the hydraulic system, or if short hydraulic cylinders are used which suffice only for raising the side booms 29 as far as the stops 44, the raising of the booms to the transport position can also be performed manually. To this end the spring cotter pins 41 are pulled from the pins 39 and the cylinder 36 as well as the piston rod are slipped off from the pins 39. To avoid having to carry the hydraulic jack 35 separately after such removal, it is loosely held on the machine 21 by the chain or cable 49.

After the booms 29 have been raised by hand to the transport position, the side booms 29 must be locked in this position, by means of the prior art, which are not shown, in order that the rubber bumper 48 may be prevented from pushing the booms 29 back beyond the top dead center of their pivoting movement. The booms can be locked in the transport position by a catch having its members mounted on the respective ends of the booms, as is shown in the embodiment of FIGS. 1–3.

SUMMARY

Thus, the invention is an improvement in a machine for discharge of granulated or powdered materials which can be coupled to a tractor and has a frame, a hopper mounted, directly or indirectly, on the frame and two side booms for projecting beyond said hopper transversely of the direction of travel with one side boom being on each side of the hopper in about the horizontal position. The booms are equipped with discharge members for the material and are mounted, directly or indirectly, on the frame so as to be pivotable in a vertically extending plane. The machine includes a lifting system for effecting the pivoting. The improvement of the invention comprises disengageable stop means which when in the engaged position are within the pivoting range of the booms for limiting upward pivoting of the side booms from said projected condition to a small angle (e.g., up to 3 ° preferably up to 45°) above the horizontal for accommodating the making of turns by the machine. The booms, when the stop means are disengaged, are pivotable upwardly beyond said small angle to a transport position.

Desirably, the booms are pivoted more than 90° from the horizontal when in the transport position, resilient transport position stop means for each boom being mounted on the frame, directly or indirectly, limiting the pivoting of the boom beyond the transport position, and the resilience and mounting of the transport position stop means is such that the transport position stop means urge the booms when in the transport position, toward said projected position and to beyond the vertical.

The machine may include conveying means for conveyance of material from the hopper to the discharge members mounted on the booms, and such conveying means may be disposed in the path of pivoting of the booms to the transport position. For such a construction, the invention provides a releasable holder for the conveying means for holding the conveying means in said disposition, and said disengageable stops include fastening means for the releasable holders so that disengagement of the disengageable stop means serves to unfasten the releasable holders, permitting moving of the conveying means out of said pivoting path. By reason of such construction, the booms cannot be moved to the transport position when the conveying means is in said disposition.

What is claimed is:

1. In a machine for the discharge of material which can be coupled to a tractor and has a frame, a container mounted on the frame at least, a side boom for projecting beyond said container transversely of the direction of travel in about the horizontal position, said boom being equipped with discharge means for said material and being mounted on the frame so as to be pivotable in a vertically extending plane, and including a lifting system for said pivoting, the improvement which comprises disengageable stop means which when in the engaged position is within the pivoting range of the side boom for limiting upward pivoting of the side boom from said projected condition to a small angle above the horizontal for accommodating the making of turns by the machine, said boom, when the stop means are disengaged, being pivotable upwardly beyond said small angle to a transport position.

2. Machine according to claim 1 the stop means being adjustable.

3. Machine according to claim 1, wherein there are two booms as aforesaid, one on each side of the tractor, and wherein the lift system comprises a hydraulic jack composed of a cylinder, piston and piston rod, the cylinder being connected to the side boom on the one side of the machine, and the piston rod being connected to the side boom on the other side of the machine.

4. Machine according to claim 3, wherein each of said connections is by a stub shaft disposed in an elongated opening.

5. Machine according to claim 3, said connections being releasable.

6. Machine according to claim 4, wherein removeable cotter pins in each stub shaft secure the stub shaft in the elongated opening.

7. Machine according to claim 1, the boom being pivoted more than 90° from the horizontal when in the transport position, resilient transport position stop means for the boom mounted on the frame limiting the pivoting of the boom beyond the transport position, the resilience and mounting of the transport position stop means being such that the transport position stop means urge the boom when in the transport position toward said projected position and to beyond the vertical.

8. Machine according to claim 7, and releasable catch means for holding the boom in the transport position against the force of the transport position stop means.

9. Machine according to claim 7, the transport position stop means being rubber.

10. Machine according to claim 1, and conveying means for the conveyance of material from the container to said discharge means, said conveying means being disposed in the path of pivoting of the boom to said transport position, a releasable holder for the conveying means for holding the conveying means in said disposition, said disengageable stop means including fastening means for the releasable holder, the disengagement of the disengageable stop means serving to unfasten the releasable holder so that the conveying means can be moved out of said pivoting path, so that the boom cannot be moved to the transport position when the conveying means is in said disposition.

11. Machine according to claim 9, and conveying means for the conveyance of material from the container to said discharge means, said conveying means being disposed in the path of pivoting of the boom to said transport position, a releasable holder for the conveying means for holding the conveying means in said disposition, said disengageable stop means including fastening means for the releasable holder, the disengagement of the disengageable stop means serving to unfasten the releasable holder so that the conveying means can be moved out of said pivoting path, so that the boom cannot be moved to the transport position when the conveying means is in said disposition.

* * * * *